Patented Nov. 27, 1934

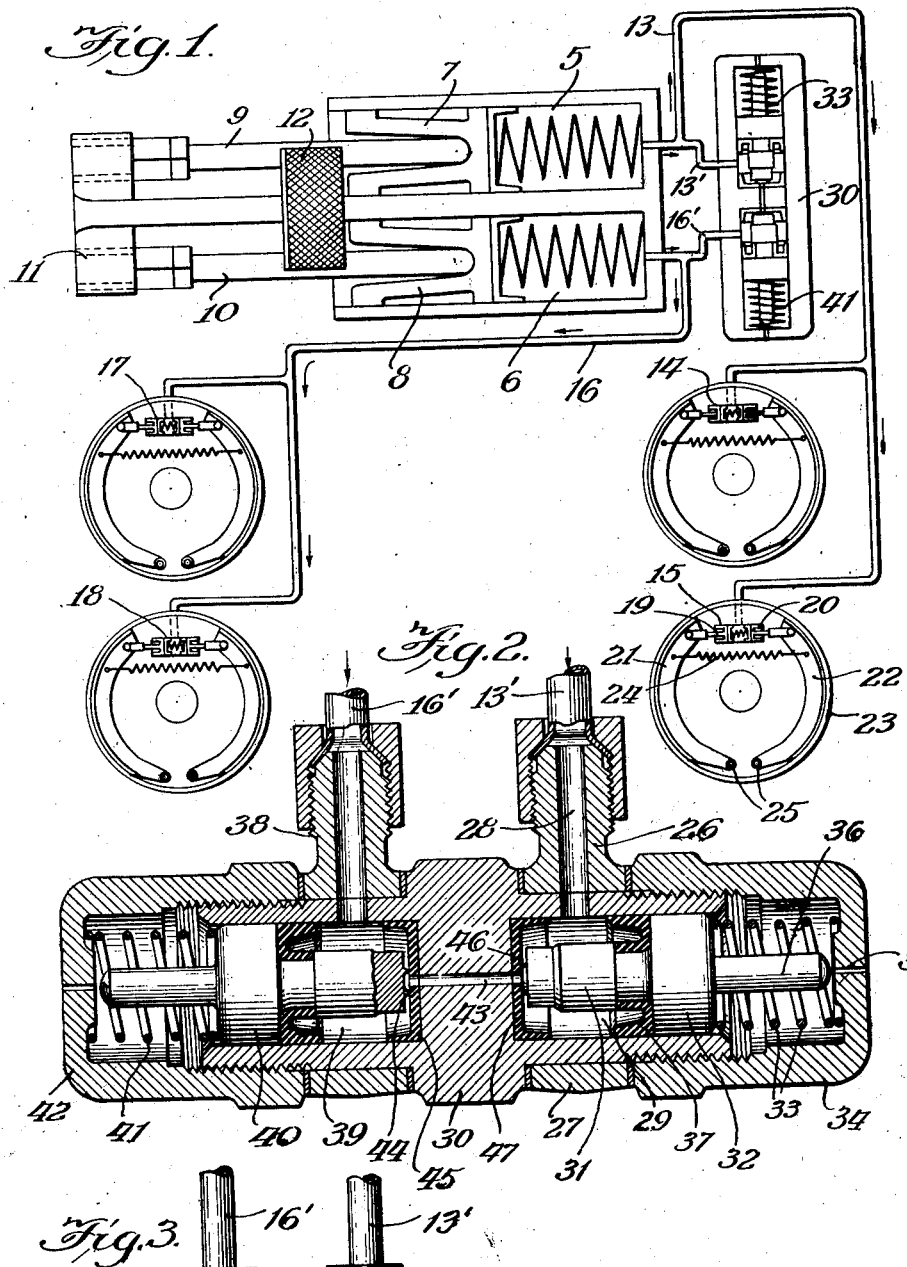

1,982,449

UNITED STATES PATENT OFFICE 1,982,449

EQUALIZED HYDRAULIC BRAKE SYSTEM

Wallace F. Oliver, Detroit, Mich., assignor to Hydraulic Brake Company, Detroit, Mich., a corporation of California Application January 22, 1932, Serial No. 588,071

1 Claim. (Cl. 60—54.5)

My invention pertains to equalized hydraulic brake systems, although certain features of the invention are not limited to use in a hydraulic brake system but may be utilized in any fluid power transmitting mechanism.

An object of my invention is to provide an improved equalized hydraulic brake system in which separate power transmission mechanisms are utilized to operate separate braking elements on the vehicle.

Another object is to provide an improved equalizer mechanism.

Another object is to provide an equalizer mechanism which operates only upon the creation of a predetermined pressure in each of two conduit systems whose pressures are to be equalized.

Another object is to provide an equalizer mechanism in which the required pressure may be changed readily.

Another object is to provide an equalizer mechanism which will be economical to manufacture and safe and reliable in service.

Other objects and advantages will become apparent as the description proceeds.

In the drawing,

Fig. 1 is a diagrammatic layout of one embodiment of a hydraulic brake system incorporating my invention;

Fig. 2 is an enlarged sectional view through the equalizer mechanism; and

Fig. 3 is an elevation of the equalizer mechanism.

Referring to the drawing, I have illustrated a hydraulic brake system comprising compression cylinders 5 and 6 in which reciprocate pistons 7 and 8 operated by piston rods 9 and 10 connected with a cross member 11 which receives force from a conventional foot pedal indicated at 12. The cylinders 5 and 6 are to be understood as connected with a suitable source of fluid supply which may be of any suitable type but preferably of the type disclosed in the copending application of Herbert C. Bowen (Case 11) filed January 14, 1932, Serial No. 586,474. The subject-matter disclosed in the instant application is an improvement on the subject-matter disclosed in said application of Herbert C. Bowen.

The cylinder 5 discharges fluid into a conduit 13 which leads to motor cylinders 14 and 15 which are most commonly mounted at the vehicle wheels, and the cylinder 6 discharges into a similar conduit 16 leading to motor cylinders 17 and 18. Each motor cylinder includes opposed pistons 19 and 20 connected to brake shoes 21 and 22, respectively, and adapted to force said shoes into engagement with brake drum 23 against the tension of retractile spring 24. The brake shoes 21 and 22 are pivoted at 25 to a brake pan or other suitable support.

Conduit 13 has a branch 13' which is connected to a nipple 26 formed on a sleeve 27. Nipple 26 has a passageway 28 which connects conduit 13' with a cylinder 29 formed in the body 30 of my equalizer mechanism. In cylinder 29 is a piston 31 having an enlarged head 32 against which presses a spring 33 supported by a cap 34 screwed to one end of the body 30. The cap 34 is provided with a vent 35. Extension 36, formed on piston 31, is adapted to contact with cap 34 and limit outward movement of the piston. A rubber cup 37 prevents leakage of fluid past the head 32.

Conduit 16 is provided with a branch 16' which is attached to a nipple 38 similar in construction to the nipple 26 previously described. Branch 16' communicates through nipple 38 with a second cylinder 39 which is of the same diameter as cylinder 29. In cylinder 39 is a piston 40 which is identical in construction and mode of operation with the piston 31. The piston 40 is acted upon by spring 41 which seats on a cap 42 threaded to the other end of the body 30. A passageway 43 connects the cylinders 29 and 39. When the brake system is at rest both ends of the passageway 43 are closed. The piston 40 is provided with an annular extension 44 which acts as a valve and seals against a rubber cup 45 under pressure of spring 41. Piston 31 is provided with a similar annular projection 46 which seals against rubber cup 47 under the action of spring 33.

The spring 33 is made of such strength that a desired predetermined pressure must be created in the cylinder 29 before the piston 31 will be moved to the right and thereby open communication between cylinder 29 and passageway 43. The predetermined pressure at which piston 31 will move to the right against the tension of spring 33 can be easily changed by simply unscrewing the cap 34 and substituting a weaker or stronger spring, as desired.

Spring 41 exerts the same force as spring 33 so that the piston 40 operates under the same pressure as piston 31. In every instance, however, the spring 33 is made sufficiently strong so that the maximum braking pressure, which in present commercial practice may be as high as 1500 pounds per square inch, when acting on the area within the annular projection 46 will be insufficient to move piston 31 from its seat unless supported by pressure in the cylinder 29. This simply means that in case of failure in one line the pressure in the other line cannot get great enough to force from its seat the piston which is associated with the broken line. It is therefore usually desirable to make the passageway 43 quite small, and an additional reason for making this passageway small is to restrict the flow of fluid from one line to another so that in case one line or conduit breaks or develops a bad leak while pistons 31 and 40 are away from their seats, the flow through the passageway 43 will be insufficient to maintain the pressure in the broken or leaking conduit, whereupon the pressure in this conduit will be dissipated and the piston controlled by this conduit will close against its seat and cut off communication between the two conduits so that the pressure in the unbroken conduit will be maintained and the brakes operated from said unbroken conduit will function normally.

Where the passageway 43 is made very small the areas included within the annular projections 44 and 46 may be made correspondingly small. This means that the force which can be exerted on the piston 40 through conduit 13', cylinder 29 and passageway 43 is extremely small, and that the piston 40 is controlled almost entirely by the pressure in conduit 16' and cylinder 39. Similarly, the piston 31 would be controlled almost entirely by the pressure existing in its conduit 13' and cylinder 29, so that, in effect, the two pistons are entirely independent and each is controlled by its conduit. The relative diameters of the passageway 43 and cylinders 29 and 39 may be varied to give any desired operating condition.

In normal operation of my new and improved braking system, actuation of the foot pedal 12 will immediately create substantially equal pressures in conduits 13 and 16 and in cylinders 29 and 39 connected therewith, and when the predetermined pressure has been reached in the cylinders 29 and 39 the pistons will move from their seats and establish communication between the two conduits through passageway 43. If, however, the pressure should rise much faster in conduit 13 than it does in conduit 16, the piston 31 would move from its seat as soon as the predetermined pressure was reached in conduit 13 and cylinder 29, thus establishing communication between conduit 13 and passageway 43. If there were a break in conduit 16 which prevented the pressure therein from reaching the predetermined pressure, piston 40 would remain against its seat and no equalization of pressures would occur. If, however, there were no break in conduit 16 and the pressure therein finally reached the predetermined pressure, piston 40 would move from its seat and fluid would flow from cylinder 29 to passageway 43 into cylinder 39 and the pressures in conduits 13 and 16 would be equalized. Upon release of the foot pedal 12, the pressures in the conduit systems drop and piston valves 31 and 40 return to their seats.

While I have illustrated and described only a single embodiment of my invention, it is to be understood that my invention may take numerous other forms and that the scope of my invention is limited solely by the following claim.

I claim:

In an equalizer mechanism for hydraulic systems of the class described, a body member having recesses in the opposite ends thereof providing concentric cylinder bores, a restricted passageway concentric with respect to said cylinder bores and formed in that portion of the body member between the inner ends of said cylinder bores for interconnecting the same, caps for closing the ends of said cylinder bores, a piston for each of said bores, each of said pistons comprising a portion for effecting a seal with one of said bores, a forwardly extending part terminating in a knife edge normally adapted to seal one end of said passageway, and a rearwardly extending part constituting a stop and adapted to contact with one of said caps, springs for biasing said pistons, said springs confined between said pistons and said caps and surrounding the rearwardly extending parts of said pistons, and means for individually supplying fluid under pressure to said cylinder bores.

WALLACE F. OLIVER.